(12) United States Patent
Boitei

(10) Patent No.: US 10,353,814 B2
(45) Date of Patent: Jul. 16, 2019

(54) METHOD AND SYSTEM FOR OPTIMIZED GARBAGE COLLECTION IN A STORAGE DEVICE

(71) Applicant: WIPRO LIMITED, Bangalore (IN)

(72) Inventor: Manasa Ranjan Boitei, Bangalore (IN)

(73) Assignee: Wipro Limited, Bangalore (IN)

(*) Notice: Subject to any disclaimer, the term of this patent is extended or adjusted under 35 U.S.C. 154(b) by 655 days.

(21) Appl. No.: 15/076,945

(22) Filed: Mar. 22, 2016

(65) Prior Publication Data

US 2017/0228313 A1   Aug. 10, 2017

(30) Foreign Application Priority Data

Feb. 8, 2016   (IN) .............................. 201641004471

(51) Int. Cl.
*G06F 12/02* (2006.01)
*G06F 12/1009* (2016.01)

(52) U.S. Cl.
CPC ...... *G06F 12/0253* (2013.01); *G06F 12/0246* (2013.01); *G06F 12/1009* (2013.01); *G06F 2212/1044* (2013.01)

(58) Field of Classification Search
CPC ............. G06F 12/0253; G06F 12/1009; G06F 2212/1044; G06F 12/0246
See application file for complete search history.

(56) References Cited

U.S. PATENT DOCUMENTS

| | | | | |
|---|---|---|---|---|
| 2007/0294503 A1* | 12/2007 | Mitra | ................... | G06F 12/0215 711/202 |
| 2011/0138105 A1* | 6/2011 | Franceschini | ....... | G06F 12/0246 711/103 |
| 2015/0127889 A1* | 5/2015 | Hwang | ............... | G06F 12/0246 711/103 |
| 2016/0283369 A1* | 9/2016 | Hada | ................... | G06F 12/0253 |

* cited by examiner

*Primary Examiner* — Reginald G Bragdon
*Assistant Examiner* — Hannah A Faye
(74) *Attorney, Agent, or Firm* — Finnegan, Henderson, Farabow, Garrett & Dunner, LLP

(57) ABSTRACT

The present disclosure relates to a method and system for optimizing garbage collection in a storage device. In an embodiment, number of free pages, number of valid pages and number of invalid pages in each of one or more memory blocks in the storage device is determined by a memory management system. Further, at least one target memory block having minimum number of free pages, minimum number of valid pages and maximum number of invalid pages is identified among the one or more memory blocks. The step of determining the number of valid pages is iteratively repeated until the number of valid pages is less than or equal to the number of free pages in at least one of the one or more memory blocks. Finally, the at least one target memory block is recycled by the memory management system, thereby optimizing the garbage collection in the storage device.

18 Claims, 4 Drawing Sheets

METHOD AND SYSTEM FOR OPTIMIZED GARBAGE COLLECTION IN A STORAGE DEVICE

TECHNICAL FIELD

The present subject matter is related, in general to memory management, and more particularly, but not exclusively to a method and system for optimizing garbage collection in a storage device.

BACKGROUND

In a storage device, Garbage Collection (GC) is a memory management technique used for reclaiming memory that is no longer used. The memory so reclaimed returns to the free memory pool (pages) that can be used for future write operations. Data is written into a storage device in terms of pages and erased in terms of memory blocks. Moreover, existing data cannot be read and written back at the same memory location. Therefore, in order to claim a stale page in the storage device, the whole memory block that includes the stale page needs to be erased.

The existing arts of garbage collection use a garbage collector component in the storage device. The garbage collector component selects a memory block having lowest number of valid pages for deletion. The garbage collector component copies valid pages of the selected memory block to a free memory block and deletes the selected memory block, thereby recycling the selected memory block.

However, the existing arts initiate the garbage collection operation only in response to a write operation on the storage device and/or when the controller in the storage device determines that only a limited number of free memory blocks are left in the storage device. As a result, the writing operation on the storage device gets delayed and the user experience gets impacted. Also, a frequent initiation of the garbage collection operation may also overload the system by consuming more processor cycles. Further, a memory block selected for deletion may also comprise a number of free pages. Deleting a memory block having the free pages will not free any memory space since the page is already free. Hence, it is necessary to consider the number of free pages in a memory block before selecting it for deletion.

The issues mainly faced in performing garbage collection in a storage device are determining the number of free pages in the memory block and recycling a memory block having minimum number of free pages, minimum number of valid pages and maximum number of invalid pages.

SUMMARY

Disclosed herein is a method and system for optimized garbage collection in a storage device. The instant idea discloses a memory management or a garbage collection technique that is optimized for resource usage and is more effective in identifying at least one target memory block for deletion. Selecting the at least one target memory block for deletion takes into consideration a combination of minimum free pages, minimum valid pages and maximum invalid pages among one or more memory blocks in the storage device.

Accordingly, the present disclosure relates to a method for optimizing garbage collection in a storage device. The method comprises determining, by a memory management system, number of free pages, number of valid pages and number of invalid pages in each of one or more memory blocks in the storage device. The memory management system identifies at least one target memory block having minimum number of free pages, minimum number of valid pages and maximum number of invalid pages among the one or more memory blocks. The step of determining the number of valid pages is iterated until the number of valid pages is less than or equal to the number of free pages in at least one of the one or more memory blocks. Further, the memory management system recycles the at least one target memory block, thereby optimizing the garbage collection in the storage device.

Further, the present disclosure relates to a memory management system for optimizing garbage collection in a storage device. The memory management system comprises a processor and a memory communicatively coupled to the processor. The memory stores processor-executable instructions, which, on execution, causes the processor to determine number of free pages, number of valid pages and number of invalid pages in each of one or more memory blocks in the storage device. The instructions further cause the processor to identify at least one target memory block having minimum number of free pages, minimum number of valid pages and maximum number of invalid pages among the one or more memory blocks. The step of determining the number of valid pages is iterated until the number of valid pages is less than or equal to the number of free pages in at least one of the one or more memory blocks. Further, the at least one target memory block is recycled, thereby optimizing the garbage collection in the storage device.

Furthermore, the present disclosure relates to a non-transitory computer readable medium including instructions stored thereon that when processed by at least one processor cause a memory management system to perform one or more operations. The operations comprises determining number of free pages, number of valid pages and number of invalid pages in each of one or more memory blocks in the storage device. The instructions further cause the processor to identify at least one target memory block having minimum number of free pages, minimum number of valid pages and maximum number of invalid pages among the one or more memory blocks. The step of determining the number of valid pages is iterated until the number of valid pages is less than or equal to the number of free pages in at least one of the one or more memory blocks. The at least one target memory blocks are recycled by the memory management system, thereby optimizing the garbage collection in a storage device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
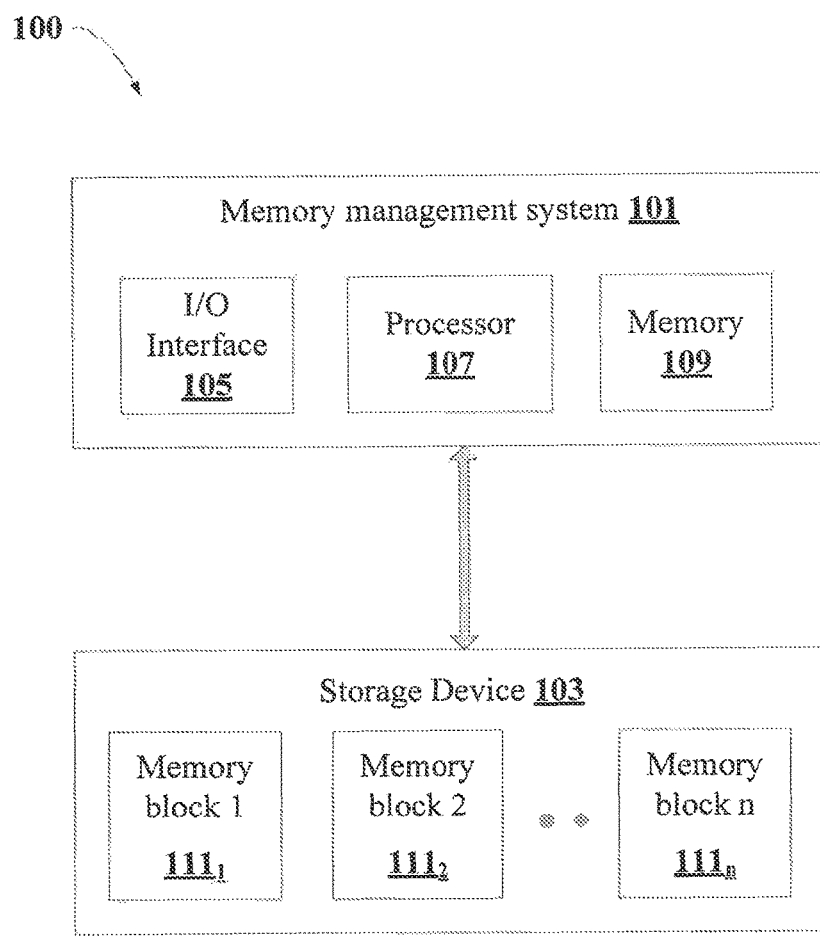
FIG. 1 shows an exemplary environment illustrating a method for optimized garbage collection in a storage device in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for optimizing garbage collection in a storage device. In an embodiment, number of free pages, number of valid pages and number of invalid pages in each of one or more memory blocks in the storage device is determined by a memory management system. Further, at least one target memory block having minimum number of free pages, minimum number of valid pages and maximum number of invalid pages is identified among the one or more memory blocks. The step of determining the number of valid pages is iteratively repeated until the number of valid pages is less than or equal to the number of free pages in at least one of the one or more memory blocks. Finally, the at least one target memory block is recycled by the memory management system, thereby optimizing the garbage collection in the storage device.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary environment illustrating a method for optimized garbage collection in a storage device in accordance with some embodiments of the present disclosure.

The environment 100 comprises a memory management system 101 for optimizing garbage collection in a storage device 103. The storage device 103 comprises one or more memory blocks, memory block 1 $111_1$ to memory block n $111_n$ (collectively referred as memory blocks 111). The memory management system 101 comprises an I/O interface 105, a processor 107 and a memory which are used for performing one or more memory management operation on the storage device 103. In an embodiment, the memory management system 101 may be present outside the storage device 103, as shown in the FIG. 1. In another embodiment, the memory management system 101 may be configured in the storage device 103. The processor 107 of the memory management system 101 determines number of free pages, number of valid pages and number of invalid pages in each of the one or more memory blocks 111. The processor 107 further identifies at least one target memory block having lowest number of free pages, lowest number of valid pages and maximum number of invalid pages. Furthermore, the processor 107 recycles each of the one or more target memory block, thereby releasing one or more free memory blocks into the pool of memory in the storage device 103.

Figure 2:
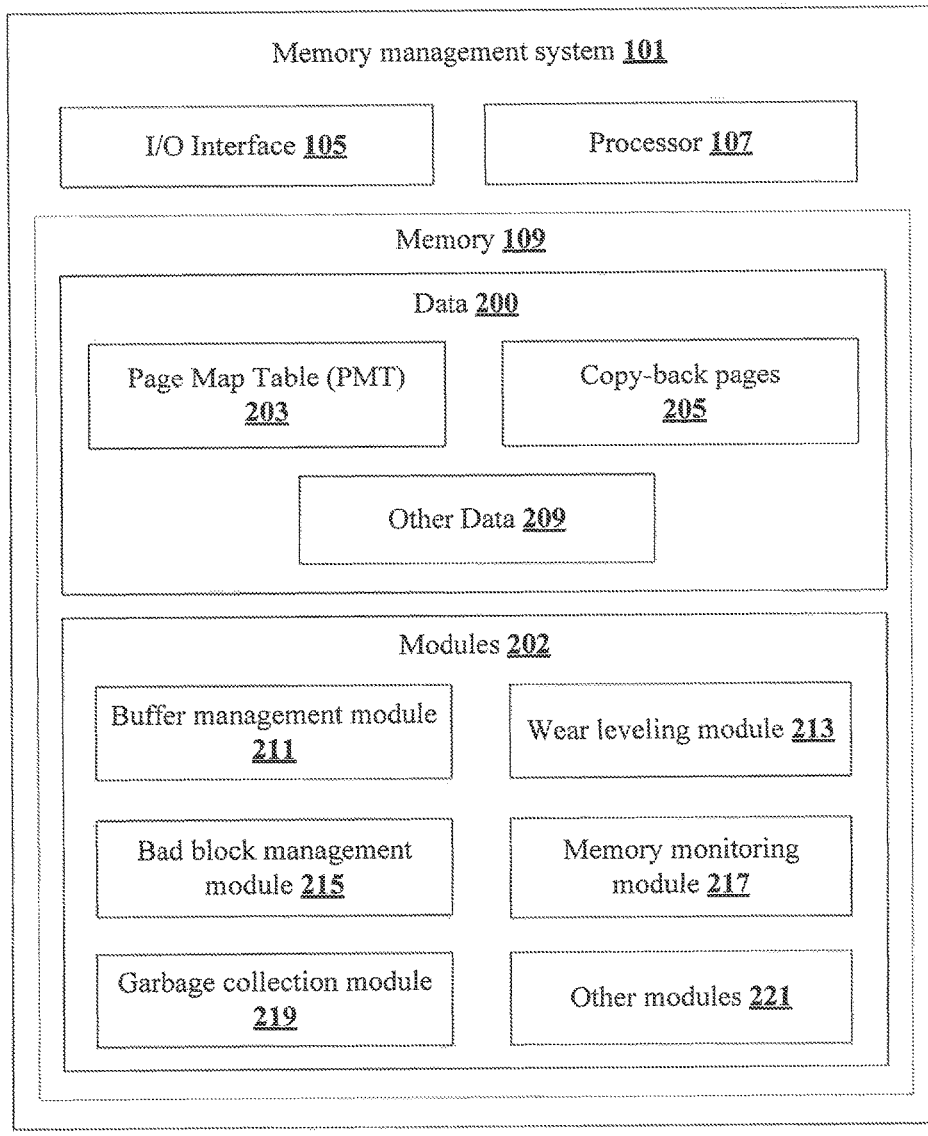
FIG. 2 shows a detailed block diagram of a memory management system in accordance with some embodiments of the present disclosure.

FIG. 2 shows a detailed block diagram of a memory management system in accordance with some embodiments of the present disclosure.

In an implementation, the memory management system 101 uses one or more data and modules stored in the memory 109 for performing one or more memory management operations on the one or more memory blocks 111 in the storage device 103. As an example, the data may include, but not limiting to, a Page Map Table (PMT) 203, one or more copy-back pages 205 and other data 209.

In one embodiment, the data 200 may be stored in the memory 109 in the form of various data structures. Additionally, the aforementioned data can be organized using data models, such as relational or hierarchical data models. The other data 209 may store data, including temporary data and temporary files, generated by modules 202 for performing the various functions of the memory management system 101.

In an embodiment, the PMT 203 stores the number of invalid pages, the number of valid pages, and the number of free pages in each of the one or more memory blocks 111 in the storage device 103. The PMT 203 is updated every time a data writing operation is performed on the storage device 103. In an embodiment, the PMT 203 is maintained by a wear leveling module 213 configured in the memory management system 101. The PMT 203 is also updated when the one or more memory blocks 111 are recycled in the storage device 103.

In an embodiment, the copy-back pages 205 are the one or more valid pages in the at least one target memory block which may be copied to one or more free memory blocks, before recycling the at least one target memory block. In an embodiment, a garbage collection module 219 configured in the storage device 103 may be used to copy each of the one or more valid pages in the at least one target memory block into the one or more free memory blocks.

In an implementation, the modules 202 may include, but not limited to, a buffer management module 211, wear leveling module 213, bad block management module 215, memory monitoring module 217, garbage collection module 219 and other modules 221. The other modules 221 may be used to perform various miscellaneous functionalities of the memory management system 101. It will be appreciated that such aforementioned modules may be represented as a single module or a combination of different modules.

In an embodiment, the buffer management module 211 reduces random writes performed on the storage device 103, thus increasing life span and performance of the storage device 103. The buffer management module 211 may also manage the various operations, such as, reading data or pages from the storage device 103 into a buffer cache and writing the modified data or pages back to the storage device 103.

In an embodiment, the wear leveling module 213 maintains the PMT 203, which includes the number of invalid pages, number of valid pages, and number of free pages in each of the one or more memory blocks 111 in the storage device 103. The wear leveling module 213 updates the PMT 203 each time a data writing operation is performed on one of the one or more memory blocks 111. Further, the wear leveling module 213 also updates the PMT 203 each time one of the at least one target memory block are recycled in the storage device 103.

In an embodiment, the bad block management module 215 isolates one or more bad memory blocks and adds each of the isolated bad memory blocks into a bad block list. This enables the bad block management module 215 to prevent the memory management system 101 from writing data in these bad memory blocks.

In an embodiment, the memory monitoring module 217 communicates with the wear levelling module to determine the number of free memory blocks in the storage device 103 based on the data stored in the PMT 203. The memory management module initiates the recycling of the at least one target memory block in the storage device 103 whenever the number of free memory blocks in the storage device 103 falls below a predefined threshold. The recycling of the at least one target memory block is initiated when the memory monitoring module 217 communicates with the garbage collection module 219. As an example, the predefined threshold for initiating the memory block recycling process may be having only three free three memory blocks in the storage device 103.

In an embodiment, the garbage collection module 219 determines the number of valid pages, the number of invalid pages, and the number of free pages in each of the one or memory blocks 111 in the storage device 103 using the PMT 203. In an embodiment, the garbage collection module 219 determines at least one target memory block in the storage device 103. The at least one target memory block are the memory blocks 111 having the lowest number of free pages, the lowest number of valid pages and the maximum number of invalid pages.

In an embodiment, the garbage collection module 219 iterates the step of determining the number of valid pages until the total number of valid pages in the set of target memory blocks is less than or equal to the total number of free pages in one or more free memory blocks. In other words, the garbage collection module 219 performs a check to see whether the valid pages in the at least one target memory block can be accommodated within the available free pages of the one or more free memory blocks.

Further, the garbage collection module 219 recycles the at least one target memory block by copying each of the valid pages in the at least one target memory block to the one or more free memory blocks. As a result of recycling the at least one target memory block, more invalid pages are freed and less valid pages are required to be copied to a free memory block. This improves the input/output performance of the storage device 103 and frees up more space at a given time. Moreover, as more than one target memory blocks are freed in a single garbage collection operation, system resource usage is optimized.

In an embodiment, upon recycling the at least one target memory block, the garbage collection module 219 communicates with the wear leveling module 213 to update the PMT 203 so as to reflect the changes in the number of pages after recycling. The above method may be explained in detail in conjunction with the below examples.

In an embodiment, consider a storage device 103 comprising eight memory blocks and having 128 memory pages in each of the eight memory blocks. The wear leveling module 213 configured in the memory management system 101 determines the number of free pages, the number of valid pages and the number of invalid pages in each of the eight memory blocks in the storage device 103. Table A below shows an exemplary view of the PMT 203 storing the number of free pages, valid pages and the invalid pages for each of the eight memory blocks.

TABLE A

| Memory block number | Free pages | Valid pages | Invalid pages |
| --- | --- | --- | --- |
| 1 | 8 | 40 | 79 |
| 2 | 0 | 30 | 97 |
| 3 | 0 | 40 | 87 |
| 4 | 30 | 25 | 77 |
| 5 | 60 | 10 | 37 |
| 6 | 80 | 15 | 52 |
| 7 | 0 | 22 | 105 |
| 8 | 0 | 25 | 102 |

Further, the garbage collection module 219 in the memory management system 101 sorts each of the eight memory blocks (having block numbers 1 to 8) shown in Table A to identify at least one target memory block. The at least one target memory block is the memory block having minimum number of free pages, minimum number of valid pages and maximum number of invalid pages among the one or more memory blocks. Hence, in order to identify the at least one target memory block, the garbage collection module 219 reconstructs the PMT 203 in a predetermined order of arrangement, such as in a descending order of the number of free pages in each of the eight memory blocks. Table B below shows an exemplary view of the reconstructed PMT 203 comprising only the target memory blocks.

TABLE B

| Memory block number | Free Pages | Valid Pages | Invalid Pages | Order/Priority of recycling |
|---|---|---|---|---|
| 7 | 0 | 22 | 105 | 1 |
| 8 | 0 | 25 | 102 | 2 |
| 2 | 0 | 30 | 97 | 3 |
| 3 | 0 | 40 | 87 | 4 |
| 1 | 8 | 40 | 79 | 5 |

Table B comprises only five memory blocks, which are the blocks having minimum number of free pages, minimum number of valid pages and maximum number of invalid pages among the eight memory blocks shown in Table A. Hence the garbage collection module 219 marks the memory blocks 7, 8, 2, 3 and 1 in Table A as the target memory blocks. In an embodiment, when there is a need to recycle multiple target memory blocks, the order and/or the priority in which each of the identified memory blocks are recycled depends on the one or more parameters. The one or more parameters considered while recycling the multiple target memory blocks may include, but not limiting to, number of free pages deleted, number of valid pages to be copied and the number of free pages released by deleting the invalid pages.

As an example, the memory block 7 in Table B, having 105 invalid pages, 22 valid pages and 0 free pages may be recycled with a highest priority since recycling the memory block 7 releases 105 invalid pages to the pool of free memory in the storage device 103. Further, recycling the memory block 7 does not involve deletion of any free pages, thereby resulting in an efficient memory management. Also, recycling the memory block 7 requires copying only 22 valid pages to another free block in the storage device 103, thereby reducing the number of read/write operations performed while backing up these valid pages.

Upon recycling the at least one target memory block, the wear levelling module updates the PMT 203 to include an updated number of the free pages, the valid pages, and the invalid pages in each of the eight memory blocks. In an embodiment, the garbage collection module 219 may recycle multiple target memory blocks when the number of free memory blocks in the storage device 103 is less than a predetermined threshold value. As an example the predetermined threshold value may be four free memory blocks. Table C shows an updated PMT 203 which is updated after recycling the multiple target memory blocks 7, 8, 2 and 3 out of the five target memory blocks identified in Table B.

TABLE C

| Memory block number | Free pages | Valid pages | Invalid pages |
|---|---|---|---|
| 1 | 8 | 40 | 79 |
| 2 | 128 | 0 | 0 |
| 3 | 128 | 0 | 0 |
| 4 | 30 | 25 | 77 |
| 5 | 60 | 10 | 37 |
| 6 | 80 | 15 | 52 |
| 7 | 128 | 0 | 0 |
| 8 | 128 | 0 | 0 |

Figure 3:
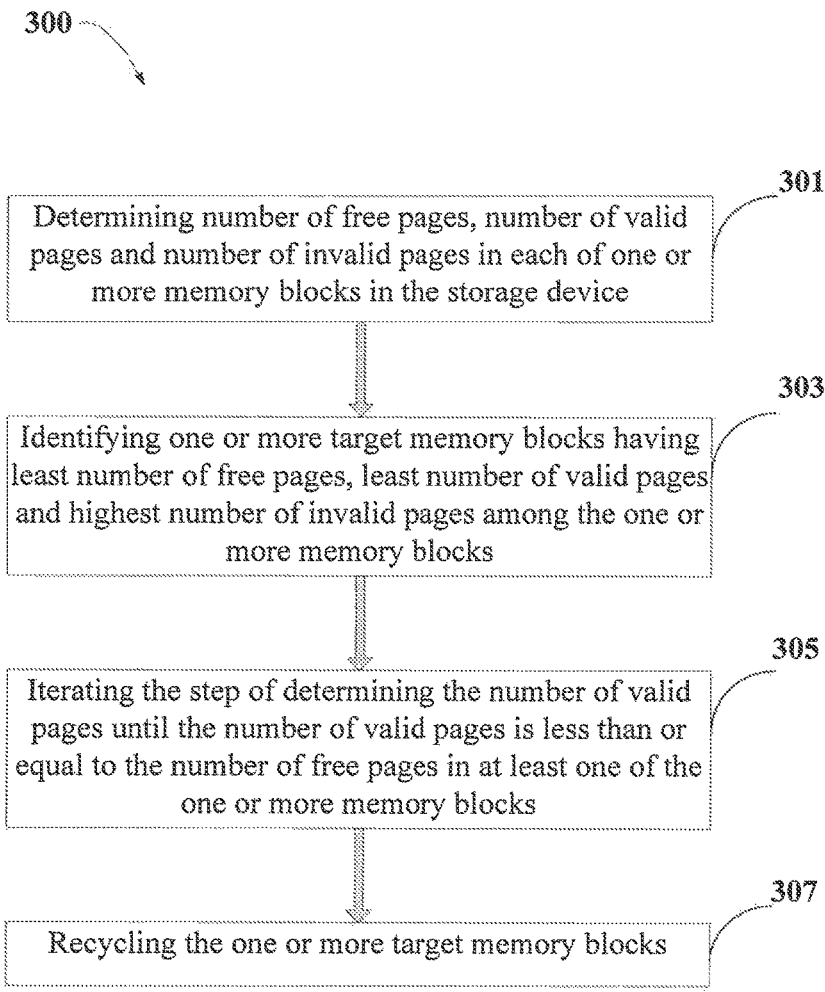
FIG. 3 illustrates a flowchart showing a method a method of optimizing garbage collection in a storage device in accordance with some embodiments of the present disclosure.

FIG. 3 illustrates a flowchart showing a method a method of optimizing garbage collection in a storage device in accordance with some embodiments of the present disclosure.

As illustrated in FIG. 3, the method 300 comprises one or more blocks for optimizing garbage collection in a storage device 103 using a memory management system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the processor 107 of the memory management system 101 determines number of free pages, number of valid pages and number of invalid pages in each of one or more memory blocks 111 in the storage device 103 using the garbage collection module 219. In an embodiment, the wear levelling module creates a page map table 203 for storing the number of free pages, the number of valid pages and the number of invalid pages in each of the one or more memory blocks 111. The wear leveling module 213 updates the page map table 203 upon recycling the at least one target memory block.

At block 303, the processor 107 of the memory management system 101 identifies at least one target memory block having minimum number of free pages, minimum number of valid pages and maximum number of invalid pages among the one or more memory blocks 111 using the garbage collection module 219.

At block 305, the processor 107 of the memory management system 101 iterates the step of determining the number of valid pages until the number of valid pages is less than or equal to the number of free pages in at least one of the one or more memory blocks 111 using the garbage collection module 219. The garbage collection module 219 performs a check to see whether the valid pages in the at least one target memory block can be accommodated within the available free pages of the one or more free memory blocks.

At block 307, the processor 107 of the memory management system 101 recycles the at least one target memory block. Recycling the at least one target memory block comprises copying each of the valid pages in each of the at least one target memory block into at least one of one or more free memory blocks in the storage device 103. In an embodiment, each of the at least one target memory block is marked as the free memory block upon recycling. Also, the wear leveling module 213 updates the PMT 203 after recycling the at least one target memory block in the storage device 103.

Computer System

Figure 4:
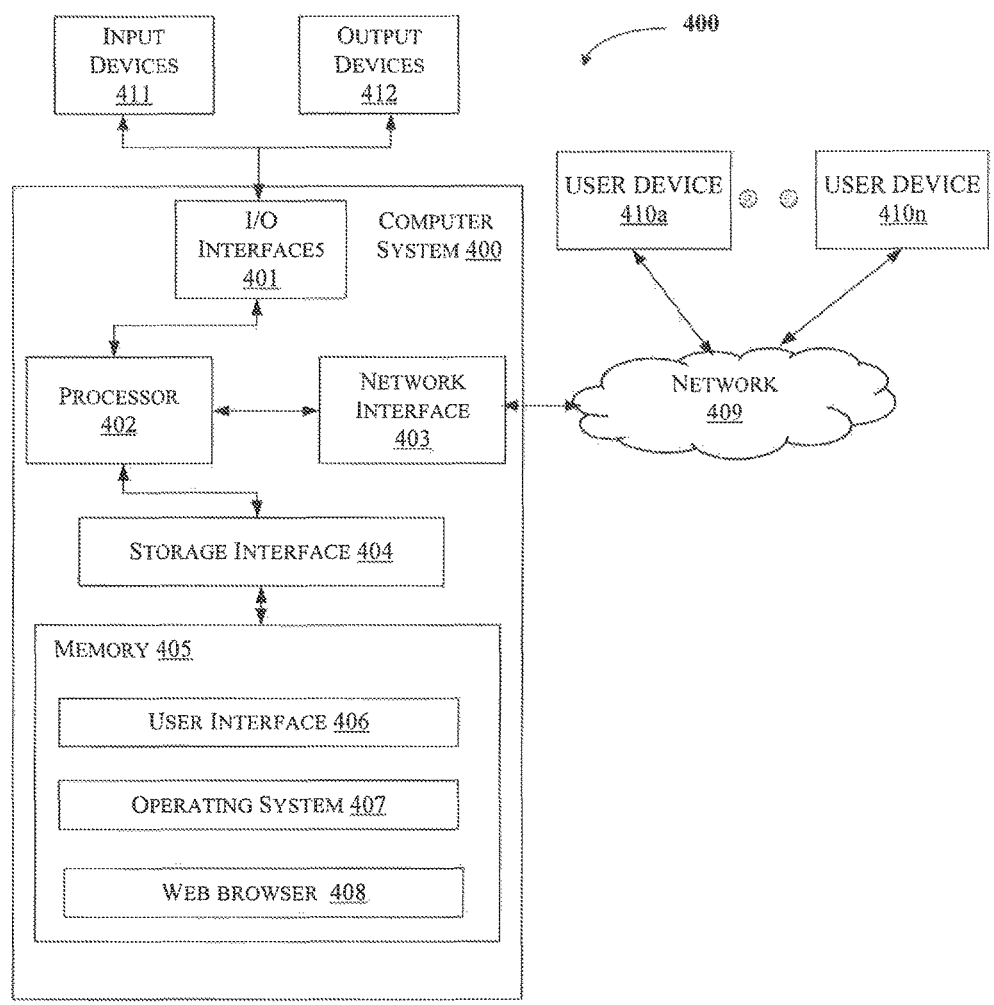
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used for optimizing garbage collection in a storage device using a memory management system 101. The computer system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 401, the computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 410 (a, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 410 (a, . . . , n) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTrPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method for optimized garbage collection in a storage device by recycling a memory block having minimum free pages, minimum valid pages and maximum invalid pages.

In an embodiment, the present disclosure provides a method for improved space utilization in a storage device by selecting a block having minimum number of free pages for deletion.

In an embodiment, the present disclosure provides a method for efficient memory management in a storage device by copying back minimum number of valid pages upon deletion of a memory block.

In an embodiment, the memory management method disclosed in the present disclosure improves the life span of the storage device by recycling only those memory blocks which are full, thereby avoiding repeated deletion of free memory pages.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | Environment |
| 101 | Memory management system |
| 103 | Storage device |
| 105 | I/O interface |
| 107 | Processor |
| 109 | Memory |
| 111 | Memory blocks |
| 200 | Data |
| 202 | Modules |
| 203 | Page Map Table (PMT) |
| 205 | Copy-back pages |
| 209 | Other data |
| 211 | Buffer management module |
| 213 | Wear leveling module |
| 215 | Bad block management |
| 217 | Memory monitoring module |
| 219 | Garbage collection module |
| 221 | Other modules |

I claim:

1. A method for optimizing garbage collection in a storage device, the method comprising:
   determining, by a memory management system, number of free pages, number of valid pages and number of invalid pages in each of one or more memory blocks in the storage device;
   identifying, by the memory management system, at least one target memory block having minimum number of free pages, minimum number of valid pages and maximum number of invalid pages among the one or more memory blocks;
   iterating, by the memory management system, the step of determining the number of valid pages until the number of valid pages is less than or equal to a predetermined threshold value indicative of the number of free pages in at least one of the one or more memory blocks; and
   recycling, by the memory management system, the at least one target memory block.

2. The method as claimed in claim 1 further comprises creating a page map table for storing the number of free pages, the number of valid pages and the number of invalid pages in each of the one or more memory blocks.

3. The method as claimed in claim 2 further comprises updating the page map table upon recycling the at least one target memory block.

4. The method as claimed in claim 1, wherein recycling the at least one target memory block comprises copying each of the valid pages in each of the at least one target memory block into at least one of one or more free memory blocks.

5. The method as claimed in claim 4, wherein the one or more free memory blocks are the memory blocks comprising only the free pages.

6. The method as claimed in claim 1, wherein each of the at least one target memory block is marked as the free memory block upon recycling.

7. A memory management system for optimizing garbage collection in a storage device, the memory management system comprising:
   a processor; and
   a memory communicatively coupled to the processor, wherein the memory stores processor-executable instructions, which, on execution, causes the processor to:

determine number of free pages, number of valid pages and number of invalid pages in each of one or more memory blocks in the storage device;

identify at least one target memory block having minimum number of free pages, minimum number of valid pages and maximum number of invalid pages among the one or more memory blocks;

iterate the step of determining the number of valid pages until the number of valid pages is less than or equal to a predetermined threshold value indicative of the number of free pages in at least one of the one or more memory blocks; and recycle the at least one target memory block.

8. The system as claimed in claim 7, wherein the instructions cause the processor to create a page map table for storing the number of free pages, the number of valid pages and the number of invalid pages in each of the one or more memory blocks.

9. The system as claimed in claim 8, wherein the instructions further cause the processor to update the page map table upon recycling the at least one target memory block.

10. The system as claimed in claim 7, wherein the instructions further cause the processor to recycle the at least one target memory block by copying each of the valid pages in each of the at least one target memory block into at least one of one or more free memory blocks.

11. The system as claimed in claim 10, wherein the one or more free memory blocks are the memory blocks comprising only the free pages.

12. The system as claimed in claim 7, wherein the instructions further cause the processor to mark each of the at least one target memory block as the free memory block upon recycling.

13. A non-transitory computer readable medium including instructions stored thereon that when processed by at least one processor cause a memory management system to perform operations comprising:

determining number of free pages, number of valid pages and number of invalid pages in each of one or more memory blocks in the storage device;

identifying at least one target memory block having minimum number of free pages, minimum number of valid pages and maximum number of invalid pages among the one or more memory blocks;

iterating the step of determining the number of valid pages until the number of valid pages is less than or equal to a predetermined threshold value indicative of the number of free pages in at least one of the one or more memory blocks; and recycling the at least one target memory block.

14. The medium as claimed in claim 13, wherein the instructions further cause the at least one processor to create a page map table for storing the number of free pages, the number of valid pages and the number of invalid pages in each of the one or more memory blocks.

15. The medium as claimed in claim 14, wherein the instructions further cause the at least one processor to update the page map table upon recycling the at least one target memory block.

16. The medium as claimed in claim 13, wherein the instructions further cause the at least one processor to recycle the at least one target memory block by copying each of the valid pages in each of the at least one target memory block into at least one of one or more free memory blocks.

17. The medium as claimed in claim 16, wherein the one or more free memory blocks are the memory blocks comprising only the free pages.

18. The medium as claimed in claim 13, wherein the instructions further cause the at least one processor to mark each of the at least one target memory block as the free memory block upon recycling.

* * * * *